United States Patent
Chandebois

(10) Patent No.: US 6,853,296 B2
(45) Date of Patent: Feb. 8, 2005

(54) METHOD AND DEVICE FOR AUTOMATICALLY LOCKING A MOTOR VEHICLE

(75) Inventor: Michael Chandebois, Forges les Bains (FR)

(73) Assignee: Peugeot Citroen Automobiles SA, Velizy-Villacoublay (FR)

(*) Notice: Subject to any disclaimer, the term of this patent is extended or adjusted under 35 U.S.C. 154(b) by 12 days.

(21) Appl. No.: 10/363,268
(22) PCT Filed: Sep. 7, 2001
(86) PCT No.: PCT/FR01/02792
§ 371 (c)(1), (2), (4) Date: Jul. 10, 2003
(87) PCT Pub. No.: WO02/20923
PCT Pub. Date: Mar. 14, 2002

(65) Prior Publication Data
US 2004/0100360 A1 May 27, 2004

(30) Foreign Application Priority Data
Sep. 8, 2000 (FR) .............................. 00 11484

(51) Int. Cl.[7] .................. B60R 25/10; B60R 25/00; B60L 1/00; G08C 19/00
(52) U.S. Cl. .................. 340/426.28; 340/426.3; 340/426.36; 340/825.72; 340/825.31; 307/10.1; 307/10.2
(58) Field of Search .................. 340/426.28, 426.3, 340/426.36, 825.31, 825.72; 307/10.1, 10.2

(56) References Cited

U.S. PATENT DOCUMENTS

| 4,672,375 A | | 6/1987 | Mochida et al. ........ 340/825.31 |
| 4,763,121 A | * | 8/1988 | Tomoda et al. ........ 340/825.54 |
| 5,973,611 A | * | 10/1999 | Kulha et al. ........... 340/825.31 |
| 6,476,517 B1 | * | 11/2002 | Okada ....................... 307/10.2 |

FOREIGN PATENT DOCUMENTS

| DE | 198 27 586 A1 | 12/1999 |
| DE | 198 51 058 A1 | 5/2000 |
| EP | 0 735 219 A | 10/1996 |
| EP | 0 984 123 A2 | 3/2000 |
| FR | 2 700 625 | 7/1994 |

* cited by examiner

Primary Examiner—Jeffery Hopsass
Assistant Examiner—Lam Pham
(74) Attorney, Agent, or Firm—Westerman, Hattori, Daniels & Adrian LLP

(57) ABSTRACT

The invention concerns a vehicle comprising an access and starting system without manual intervention comprising first means (1) for determining the presence or the absence of an identifier in at least in watching zone outside the vehicle and second means (2) for determining whether the doors are opened or closed and third means (3) for determining whether the motor vehicle engine is running or cut off. The method consists in automatically locking the motor vehicle on successively detecting the following conditions: a door is opened, the engine is not running and all the doors are closed, there is no identifier in the monitoring zone at a time (t), there is an identifier in the monitoring zone at a time (t−1) preceding the time (t) at which the absence of the identifier has been detected.

20 Claims, 4 Drawing Sheets

METHOD AND DEVICE FOR AUTOMATICALLY LOCKING A MOTOR VEHICLE

BACKGROUND OF THE INVENTION

The invention relates to a method and a device for automatic locking of an automobile and in particular for automatic locking of the doors when an occupant, and in particular the driver, leaves the automobile.

Automobiles are known which include a system for access and starting without manual intervention, known as hands-free access and starting; such a system permits the unlocking of the doors and/or other antitheft security devices of the automobile without manual intervention by the user.

For this, the user is provided with a recognition means, or "identifier", which permits a control unit for the unlocking of the automobile to recognise the authorised user when the user is close to a door of the automobile and, generally, when the user actuates the opening handle or more generally any device for controlling the external opening of the door.

The identifier may consist for example of an electronic card or a transmitter supplying an identification code which must be recognised by the control unit for unlocking of the automobile in order to permit the unlocking manoeuvre.

Vehicles having a hands-free access and starting system currently necessitate an action by the user when the latter leaves the automobile in order for locking of the automobile, and for example locking of the doors, to be carried out. Generally, in order to activate the locking means the user actuates a push-button situated on the external opening control of the door.

There is at present a demand by users of vehicles having the hands-free access and starting function for not only unlocking but also locking of the automobile to be carried out, with great operating reliability, in a totally automatic manner without manual intervention when the user leaves his automobile.

Automatic locking of the vehicle necessitates that certain precautions be taken in order to avoid untimely locking before the driver has got out and moved away from the vehicle or when passengers have remained inside the vehicle.

It is also necessary for the locking device to be controlled on the basis of totally reliable data concerning the presence or absence of an identifier close to the automobile.

In order to design an automatic locking device which takes account of all the possible cases and only carries out locking deliberately, it is necessary to carry out a large number of checks which may necessitate special installation of detectors in the interior or on the exterior of the automobile.

A priori, a locking system which satisfies all the requirements is therefore a complex and costly device.

The vehicles which are equipped with a hands-free access and starting system generally includes means for detecting the presence or absence of a user equipped with an identifier in a defined zone, generally outside the automobile and close to a door, these detection means generally including one or several external antennas.

The automobiles usually also include means for detecting the open or closed condition of the doors used as a security device in order to signal this open and closed condition on a display means of the instrument panel or in order to prohibit the starting of the automobile automatically in the event that a door has remained open.

The automobiles also include means which make it possible to detect whether the engine of the vehicle is stopped or running.

These means have never been used in order to carry out automatic locking of an automobile equipped with a hands-free access and starting system in a totally reliable manner.

SUMMARY OF THE INVENTION

The object of the invention therefore is to propose a method of automatic locking of an automobile including a system for access and starting without manual intervention which comprises first means for detecting the presence or the absence of an identifier in at least one monitoring zone outside the vehicle and close to a door, as well as second means for detecting the open or closed condition of the doors and third means for detecting the running or stopped condition of the engine of the automobile, this method making it possible to carry out automatic locking of the vehicle, solely deliberately, without the use of detection means in addition to those with which the vehicle is already provided.

To this end the locking of the vehicle is controlled automatically in the case where the following conditions are detected successively:

opening of a door, stopping of the engine and closing of all the doors of the automobile, absence of the identifier in the monitoring zone outside the automobile at a time t, presence of the identifier in the monitoring zone at a time t−1 preceding the time at which the absence of the identifier was detected.

In certain cases, when the automobile is equipped with a system for volumetric detection of the presence of persons in the passenger cell of the vehicle, the automatic locking control of the automobile is subjected to an additional condition of non-presence of a passenger in the passenger cell of the automobile.

In a preferred embodiment of the invention, the presence of the identifier in the monitoring zone is detected by transmitting a low-frequency wave into at least one coverage zone at the periphery of the automobile from at least one first transmission and reception means associated with the automobile, in such a way that the low-frequency wave is received by the identifier provided in the form of a second transmission and reception means and that a return wave is sent by the identifier to the first transmission and reception means associated with the automobile.

The return wave sent by the identifier to the first transmission and reception means associated with the automobile is preferably a high-frequency wave.

The invention also relates to an automatic locking device which permits the method according to the invention to be carried out.

In order to assist understanding of the invention a description will now be given, by way of example and with reference to the accompanying drawings, of an embodiment of the method according to the invention on an automobile equipped with a hands-free access and starting system.

BRIEF DESCRIPTION OF THE FIGURES

FIG. 4 shows the coverage zones of the antennas operated at a rated transmission power.

FIG. 5 shows the coverage zones of the antennas operated at a transmission power higher than the rated power.

DETAILED DESCRIPTION OF THE INVENTION

Figure 1:
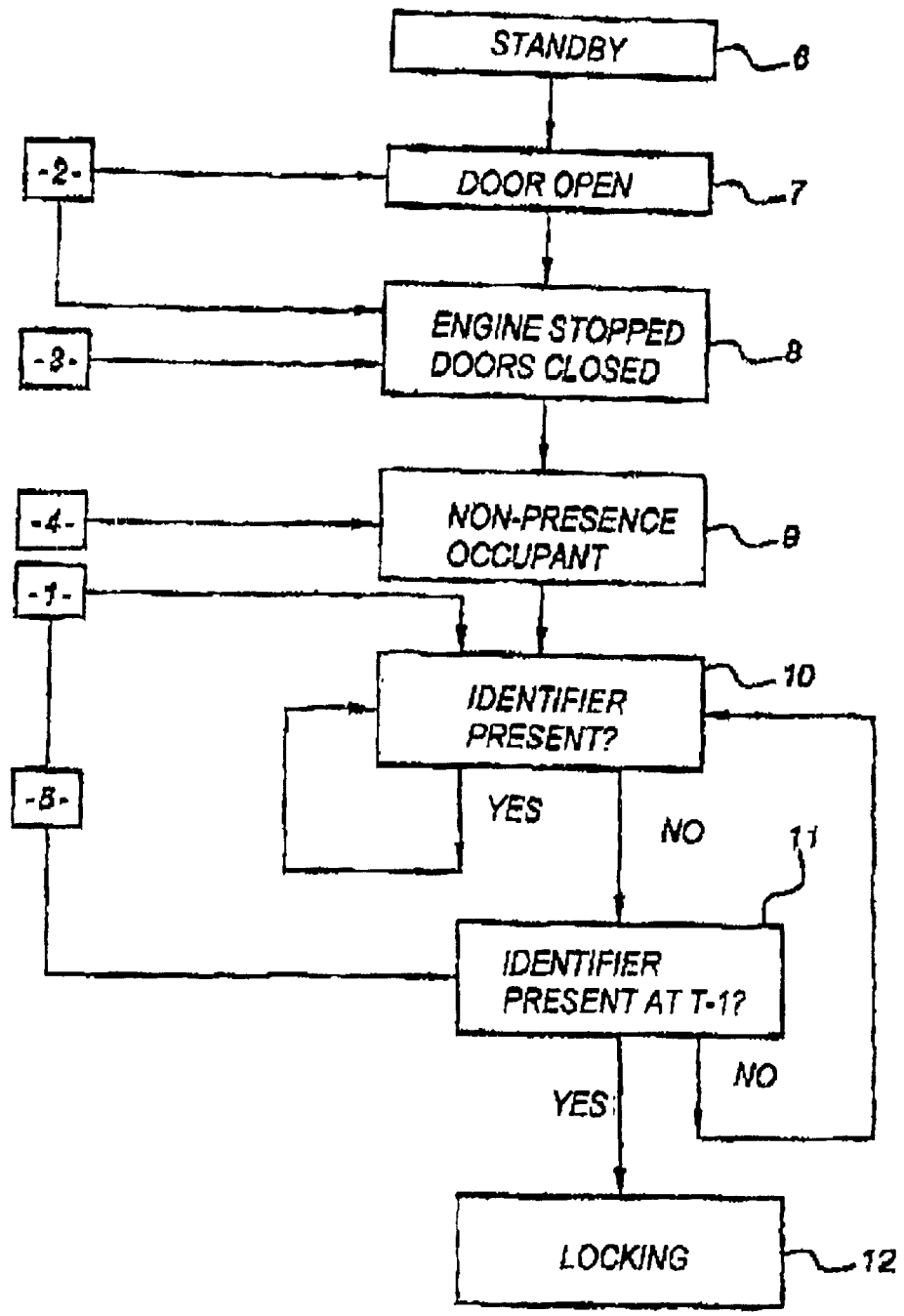
FIG. 1 is a flow diagram showing the development of the controls and checks which can lead to the locking of the doors of an automobile in an automatic manner.

In the left-hand part of FIG. 1 there are represented the means for detection and processing which permit the different operational steps indicated by the blocks to be carried out.

The detection means appearing on the left of the diagram include first means 1 for detecting the presence or the absence of an identifier in a zone outside the automobile. The first detection means include for example antennas outside the vehicle permitting coverage of a zone situated in the vicinity of a door of the vehicle and for example in the vicinity of the driver's door.

The identifier, the presence or non-presence of which is monitored in the monitoring zone, can for example be an electronic or optical card bearing a code which is read or a transmitter from which the transmission is picked up by the means 1 which are connected to the automatic unlocking system for the doors of the automobile.

There are a large number of technologies in existence for verifying the presence of an identifier in the monitoring zone.

In a general manner, at least one transmitter/receiver associated with the automobile, for example a transmitting/receiving antenna fixed on the automobile, permits a radio-frequency wave to be transmitted into a coverage zone surrounding the automobile. When the identifier is in the coverage zone it picks up the wave by means of an integrated receiver and in response transmits a radio-frequency wave in the direction of the transmitter/receiver associated with the automobile in such a way that the transmitter/receiver is informed of the presence of the identifier in the coverage zone of the antenna.

Figure 2:
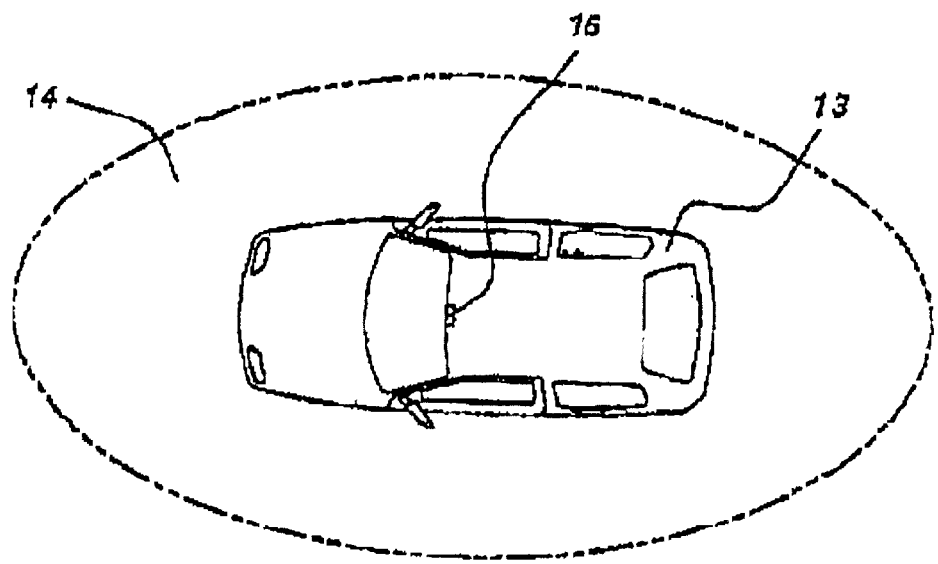
FIG. 2 is a view from above of an automobile equipped with a high-frequency transmitting and receiving antenna.

When a high-frequency wave is transmitted from the transmitter/receiver 15 associated with the automobile, the coverage zone 14 of one single antenna 15 fixed on the automobile 13 can extend all around the automobile 13, as can be seen in FIG. 2. However, the extent of the coverage zone 14 and the shape and arrangement of the contour delimiting the coverage zone at the periphery of the automobile are subject to variations and are not very predictable.

The use of high frequencies does not permit satisfactory control of the radiation pattern of the antenna. The detection of the presence of the identifier in a zone surrounding the automobile is therefore very uncertain and covers a substantial perimeter relatively distant from the vehicle.

In the case of implementation of the method according to the invention, therefore, it is preferable to transmit low-frequency waves from at least one transmitter such as a transmitting antenna fixed on the automobile. The use of low-frequency waves permits control of the radiation pattern of the transmitter in a satisfactory manner and therefore definition of at least one coverage zone which is precise in terms of its extent and its position at the periphery of the automobile. However, the coverage zone of a low-frequency transmitter is substantially less extensive than the coverage zone of a high-frequency transmitter and it may be necessary, in order to obtain a monitoring zone extending all around the automobile, to use several low-frequency transmitters.

Figure 3:
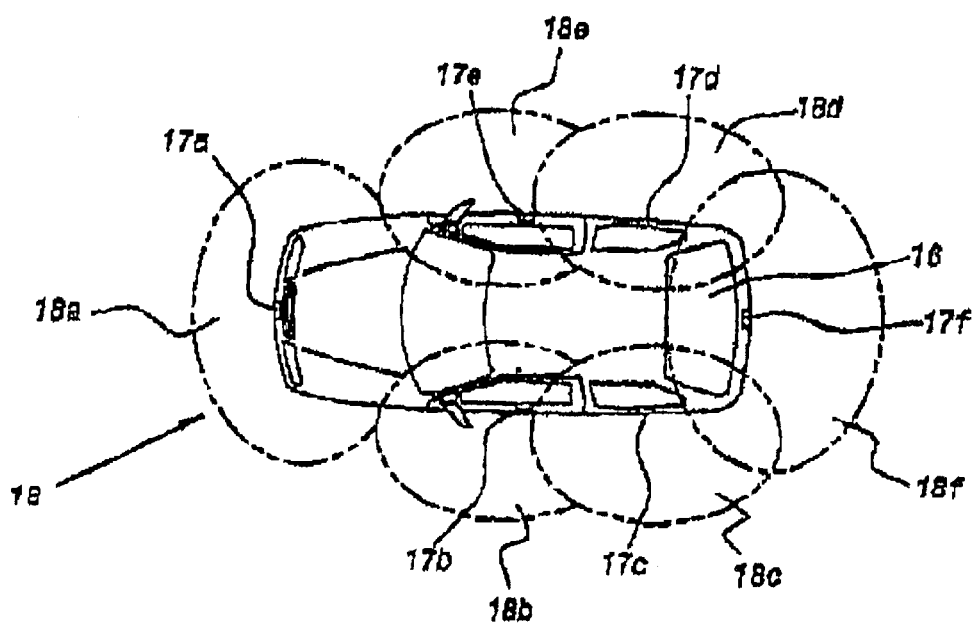
FIG. 3 is a view from above of an automobile equipped with a plurality of low-frequency transmitting antennas according to a first embodiment.

FIG. 3 shows an automobile of which the monitoring zone 18 consists of six coverage zones 18a, 18b, 18c, 18d, 18e and 18f of six low-frequency antennas 17a, 17b, 17c, 17d, 17e and 17f respectively fixed on the automobile in such a way that the coverage zones extend along the periphery of the automobile 16 and completely surround the automobile.

The antennas are placed in such a way that they are not apparent. For example, the antennas disposed on the sides of the automobile can be integrated into the door handles; antennas directed towards the rear or towards the front of the automobile can be integrated into the rear bumper or the front bumper.

However, in order to obtain a sufficient rapidity of response of the system the low-frequency transmitting antennas are equipped with high-frequency receivers in such a way that the identifier can send a high-frequency return wave to the antennas when it receives a low-frequency wave transmitted by an antenna.

The low-frequency transmitter fixed on the automobile are advantageously controlled in such a way as to transmit waves at a frequency close to 125 kHz and according to the country in which the automobiles are used the response frequencies of the antennas (and therefore the transmission frequencies of the identifiers) can be for example 315, 433 or 866 MHz.

The detection means of the system for locking the automobile also include second detection means 2 consisting of detectors of the open and closed condition of each of the doors of the vehicle and third detection means 3 for detecting the running or stopped condition of the engine of the automobile and also possible fourth means 4 consisting of at least one sensor for volumetric detection of the presence or the absence of passengers in the interior of the automobile.

It may be noted that the detection means used in the automatic system for locking of the automobile which are shown in the drawings can be means with which automobiles provided with a hands-free access and starting system are usually equipped.

The first means 1 for detection of an identifier are connected to a memory 5 which ensures the storage of data concerning the presence or the non-presence of the identifier in the monitoring zone at successive times t−1, t+1, . . . , where the unit of time used may be for example the second.

The meaning of the functional blocks which correspond either to a detected condition or to an interrogation will be given below:

the block 6 corresponds to the standby position of the automatic locking system.

the block 7 corresponds to the open condition of a door of the automobile; the corresponding data is supplied by the detector 2.

the block 8 corresponds to a condition of the vehicle with its engine stopped and all its doors closed; the corresponding condition is determined by the detection means 2 and 3.

the block 9, which is an optional element in the sequence of the method according to the invention, corresponds to a condition of the passenger cell of the automobile in which the presence of any occupant has not been detected; the corresponding data is supplied by the detection system 4 of the perimetric type situated in the passenger cell of the vehicle, step 9 of the method being carried out only in the case where the vehicle has such a detection device in the interior of the passenger cell, for example used in order to trigger an alarm.

the block 10 corresponds to the question: is the identifier present in the monitoring zone outside the vehicle at a time t?

the block 11 corresponds to the question: is the identifier present in the monitoring zone outside the vehicle at a time t–1?

the reference 12 designates the control unit for locking of the automobile which may be in particular a control unit for locking of the doors.

The flow diagram of the method which is represented in FIG. 1 will be described below.

Starting from a standby condition of the locking system represented schematically by the block 6, we pass to the condition represented by the block 7 when an occupant of the automobile opens a door. The condition represented by the block 8, that is to say stopping of the engine and the doors of the vehicle all closed, corresponds for example to the case where the driver of the automobile has switched off the engine in order to get out of the vehicle of which he has closed the door again.

Step 9 is then optionally carried out, corresponding to the verification of the non-presence of an occupant in the passenger cell of the automobile, this verification being carried out by the peripheral alarm of the vehicle when it is equipped with such an alarm.

This optional step triggered by the detector 4 may be useful in order to avoid locking of the doors of the vehicle when the driver has got out and there are occupants remaining in the automobile. However, this step is not essential, and it is possible to pass directly from step 8 of noting the condition of the automobile with engine stopped and doors closed to step 10 corresponding to the interrogation: is the identifier present at this moment in the monitoring zone outside the automobile? The response to this question is given by the first detection means 1 consisting for example of antennas outside the vehicle, the identifier being a transmitter permitting recognition of the authorised user of the automobile.

If the identifier is present in the monitoring zone, in the case where this zone consists of an assembly of coverage zones of antennas transmitting at low frequency, as represented in FIG. 3, the identifier receives a low-frequency wave and in response transmits a high-frequency wave in the direction of the high-frequency receiver of an antenna. The reception of the high-frequency return wave permits the presence of the identifier in the monitoring zone to be determined.

In the case where the identifier is present in the monitoring zone outside the vehicle, we return to step 10 to ask the question again at a time following the first interrogation, as represented by the arrow marked YES.

This case corresponds for example to the case where the driver who has got out of the automobile has stopped his engine and closed the door but is still situated in the monitoring zone outside the automobile. In this case locking is not carried out and the driver can get back into his vehicle immediately to re-start it.

In the case where the response is NO, that is to say the case where the user equipped with the identifier is not detected in the monitoring zone outside the automobile, we pass to step 11 corresponding to the interrogation: is the identifier present in the monitoring zone at a time t–1 preceding the time at which its absence was noted in the monitoring zone?

In the case where the response is NO, that is to say in the case where the user of the vehicle equipped with the identifier was not situated in the monitoring zone at the preceding time, we return to step 10. This case corresponds to the case of a user who has remained inside the automobile, engine stopped, after having opened a door of the automobile and then closed it again. In this case the locking of the doors is not carried out and the question concerning the presence of the identifier in the monitoring zone is asked again.

When the identifier is absent from the monitoring zone at the time t but was present in this zone at the time t–1, the control unit 12 for locking of the doors of the automobile is activated. This situation corresponds to the case of an occupant who has got out of the automobile, engine stopped, has closed the doors again and has moved away from the vehicle, leaving the monitoring zone. In this case the locking of the doors of the automobile must be ensured.

The presence or the absence of the identifier in the monitoring zone at the time t–1 is determined by the memory 5 connected to the first detection means 1.

In certain cases and in particular when low-frequency transmitting antennas are used, in order to increase the precision and the reliability of detection the identifier monitoring zone consisting of the juxtaposed transmission zones of the antennas does not surround all of the vehicle.

In fact, in order to obtain better definition of the transmission zones of the antennas, it may be provided that these zones do not overlap.

Figure 4:
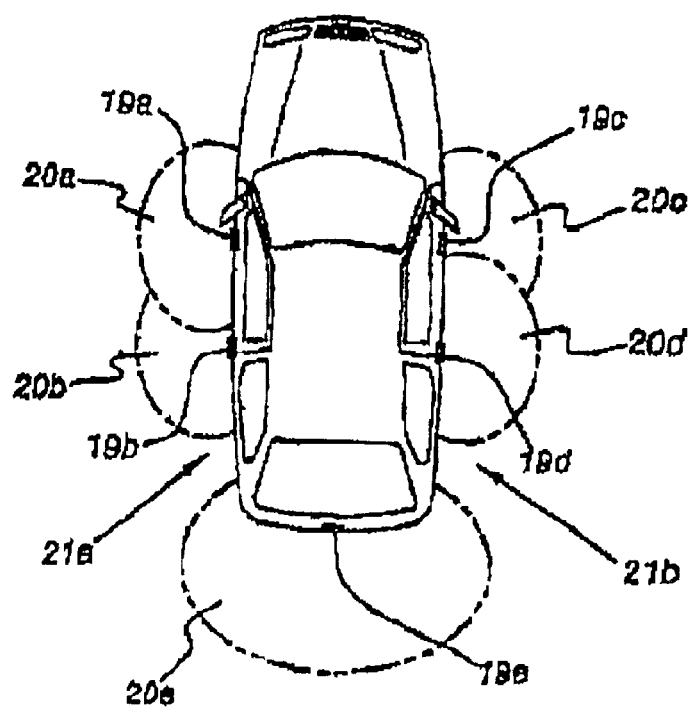
FIGS. 4 and 5 are views from above of an automobile equipped with a plurality of low-frequency transmitting antennas according to a second embodiment.

Such a case is represented in FIG. 4. The automobile has five transmitting antennas 19*a*, 19*b*, 19*c*, 19*d*, 19*e* distributed about the periphery of the vehicle and, for example, disposed in the doors and on the boot of the automobile, transmitting in five coverage zones 20*a*, 20*b*, 20*c*, 20*d*, 20*e* respectively. The coverage zones of the antennas situated towards the rear of the vehicle 20*b*, 20*d* and 20*e* do not overlap when the antennas transmit at their rated power. Therefore two zones 21*a* and 21*b* exist towards the rear of the vehicle, respectively between the coverage zones 20*b* and 20*e* and 20*d* and 20*e*, in which the coverage by the waves is not ensured.

In this case, when the user of the vehicle leaves the passenger cell and goes towards the rear of the vehicle, for example towards the fuel filler compartment flap in order to fill up with fuel or for access to the boot, he momentarily escapes the control of the antennas when he passed through one of the zones 21*a* and 21*b*.

At step 10 of the method (as represented in the diagram of FIG. 1) the response becomes NO and locking of the vehicle is triggered, the identifier being present in the monitoring zone at the time t–1. This locking is unexpected in so far as it also concerns the fuel filler compartment flap. Locking is no longer necessary in so far as the user remains close to the vehicle and does not wish to move away from it.

It is therefore desirable to avoid locking of the vehicle when the user equipped with the identifier moves towards the rear of the automobile.

Figure 5:
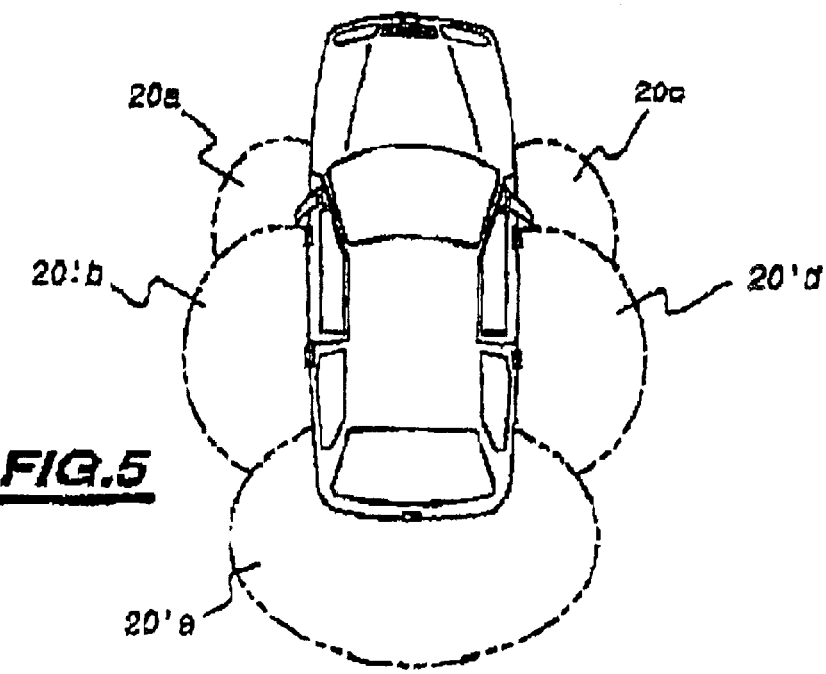

As represented in FIG. 5, operation of the transmitting antennas 19*b*, 19*d* and 19*e* at a power higher than the rated transmission power (control at 100%+X%) permits the coverage zones 20*b*, 20*d* and 20*e* to be extended in such a way that these extended zones 20'*b*, 20'*d* and 20'*e* overlap and there is no longer any non-monitored zone such as the zones 21*a* and 21*b* (FIG. 5). The locking of the vehicle is no longer carried out when the user of the vehicle moves towards the rear, for example to reach the fuel filler compartment flap, because in step 10 of the control method the identifier remains present.

The automatic locking of the vehicle is only carried out when the user moves away from the vehicle in such a way as to be situated outside all of the coverage zones.

Figure 6:
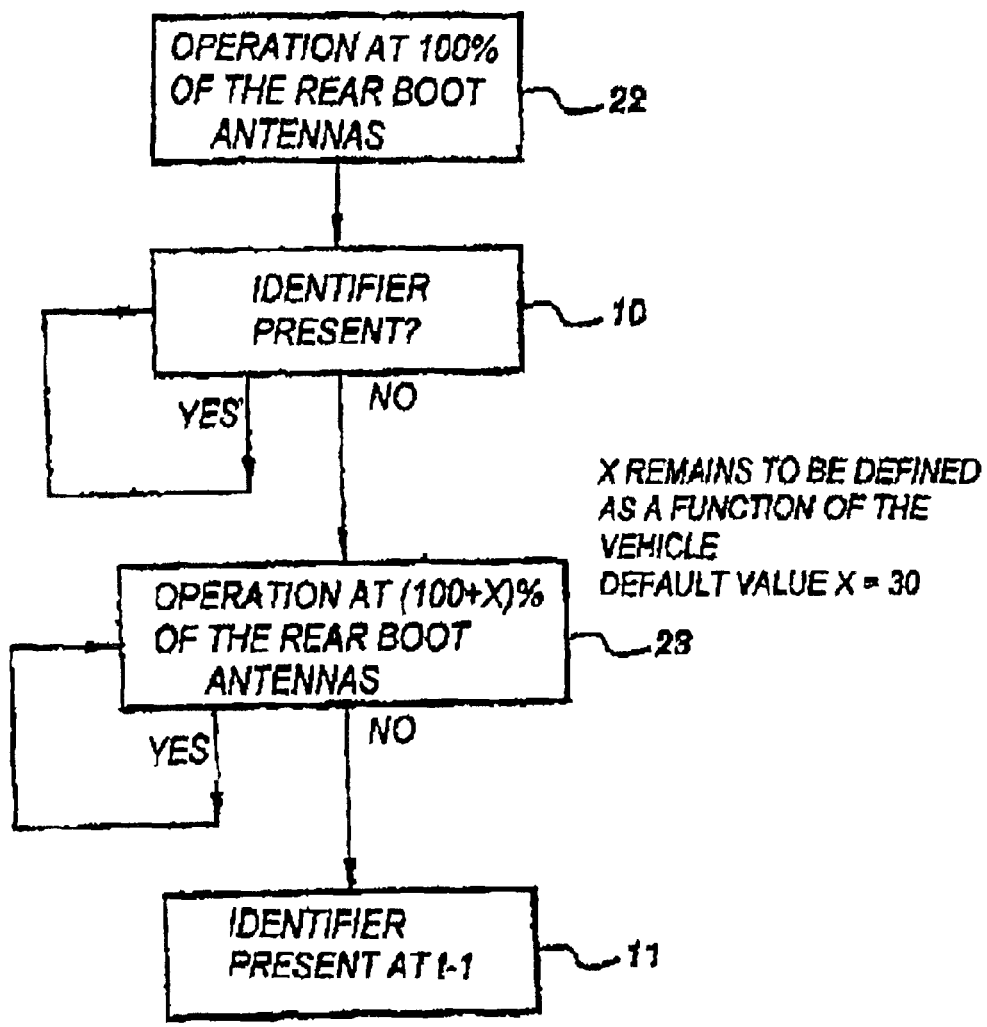
FIG. 6 is a partial flow diagram relating to the use of the antennas according to the second embodiment.

In FIG. 6 there are represented, in the form of a flow diagram, the supplementary steps 22 and 23 which are carried out prior to step 10 and between step 10 and 11 of the method as described above with regard to FIG. 1.

Step 22 is a step of operating the antennas fixed at the rear of the vehicle (for example the antennas 19*b*, 19*d* and 19*e* fixed respectively on the rear doors and the boot of the vehicle) at their rated transmission power (or operation at 100%). The step 23 which is carried out when the identifier is absent from the monitoring zone is a step of adjusting the transmission power of the rear antennas to a higher level than the rated power (operation at 100%+X%). X may be between 0 and 100, for example equal to 30.

In a general manner, at least some of the transmitting antennas of the vehicle, and more particularly the rear antennas, can be operated at a power higher than the rated transmission power when the absence of the identifier in the monitoring zone has been detected after a period of presence.

Therefore the method and the device according to the invention which have just been described make it possible to carry out totally automatic locking of the doors of the automobile, taking account of all the possible situations so that locking is only carried out deliberately.

On the other hand, the method and the device according to the invention only make use of the detection means with which a modem automobile provided with a hands-free access and starting system is equipped. However, in order to obtain a very good definition of the monitoring zone it may be necessary to use low-frequency transmitters, whereas the usual systems for automatic unlocking or locking of automobiles generally include high-frequency transmitters/receivers.

The conduct of the method of locking is ensured by the unit 12 which is also present in the automobile, which is only actuated when the different successive states necessary for locking have been verified.

These verifications may be carried out by logic elements, electronic elements connected to the detection means or by means of simple wiring connecting the control unit 12 to the detection means.

Therefore the method and the device according to the invention have a great simplicity and are less costly due to the fact that they do not necessitate the installation of a special element.

The locking of the automobile, for example the locking of the doors, of the fuel filler compartment flap, of the steering or of a starting system of the automobile can be carried out in a totally automatic manner, so that it is possible to suppress any control means such as a push-button associated with an external opening control of a door of the automobile, for example a handle.

The invention is not limited to the embodiment which has been described.

The different successive conditions which are necessary in order to obtain the locking can be verified by using any type of detection means. In certain cases the detection means can be part of the locking system, even though this solution does not offer the same advantages as regards the cost price as a system using solely the means which are usually provided on the automobile.

In a general manner, the means for detection of the presence of an identifier in a monitoring zone outside the vehicle can be constituted by any detection assembly such as has been described above including a plurality of transmitting/receiving antennas fixed on the automobile in such a way as to transmit waves, particularly at low frequency, into a plurality of respective coverage zones at the periphery of the automobile. When the antennas are operated at their rated transmission power, the coverage zones of these antennas can either completely surround the automobile or can leave certain zones unmonitored between them. In this latter case, a means may be provided for operating the antennas at a power level higher than the rated power which can be actuated when the identifier is absent from the monitoring zone after a time of being present.

The invention applies to any type of automobile used for the transport of passengers or of goods.

What is claimed is:

1. Method of automatic locking of an automobile including a system for access and starting without manual intervention which comprises a first means for detecting the presence or the absence of an identifier in at least one monitoring zone outside the vehicle and close to a door, as well as second means for detecting the open or closed condition of the doors and third means for detecting the running or stopped condition of the engine of the automobile, wherein the locking of the vehicle is controlled automatically in the case where the following conditions are detected successively:

opening of a door of the automobile,
   stopping of the engine and closing of all the doors of the automobile,
   absence of the identifier in the monitoring zone outside the automobile at a time (t),
   presence of the identifier in the monitoring zone at a time (t−1) preceding the time (t) at which the absence of the identifier was detected.

2. Method as claimed in claim 1, wherein it is further verified, before checking the presence of the identifier in the monitoring zone, that no occupant is present in the passenger cell of the automobile.

3. Method as claimed in claim 1, wherein the presence of the identifier in the monitoring zone is detected by transmitting a low-frequency wave into at least one coverage zone at the periphery of the automobile from at least one first transmission and reception means associated with the automobile, in such a way that the low-frequency wave is received by the identifier provided in the form of a second transmission and reception means and that a return wave is sent by the identifier to the first transmission and reception means associated with the automobile.

4. Method as claimed in claim 3, wherein the presence of the identifier is detected by transmitting antennas distributed at the periphery of the automobile and operated at a rated transmission power, and that when an absence of the identifier in the monitoring zone is detected at least some of the antennas of the vehicle, are operated at a higher transmission power than the rated transmission power.

5. Method as claimed in claim 3, wherein the low-frequency wave transmitted from the first transmission and reception means has a frequency close to 125 kHz.

6. Method as claimed in claim 3, wherein the return wave sent by the identifier to the first transmission and reception means associated with the automobile is a high-frequency wave.

7. Method as claimed in claim 3, wherein it is further verified, before checking the presence of the identifier in the monitoring zone, that no occupant is present in the passenger cell of the automobile.

8. Method as claimed in claim 4, wherein when an absence of the identifier in the monitoring zone is detected, some at least of the antennas of the vehicle are operated at a transmission power of 100%+X% of the rated power, where X is between 0 and 100 and preferably equal to 30.

9. Method as claimed in claim 4, wherein it is further verified, before checking the presence of the identifier in the monitoring zone, that no occupant is present in the passenger cell of the automobile.

10. Method as claimed in claim 5, wherein it is further verified, before checking the presence of the identifier in the monitoring zone, that no occupant is present in the passenger cell of the automobile.

11. Method as claimed in claim 6, wherein the high-frequency wave sent by the identifier has one of the following frequencies: 315, 433, 866 MHz.

12. Method as claimed in claim 8, wherein it is further verified, before checking the presence of the identifier in the monitoring zone, that no occupant is present in the passenger cell of the automobile.

13. Device for automatic locking of an automobile including a system for access and starting without manual intervention and comprising first means for detecting the presence or the absence of an identifier in at least one monitoring zone outside the vehicle and close to a door, as well as second means for detecting the open or closed condition of the doors of the automobile and third means for detecting the running or stopped condition of the engine of the automobile, wherein a control unit for locking of the automobile is connected electrically or via electronic logic means to the first means for detection of the presence or the absence of an identifier in the monitoring zone outside the vehicle and to a unit for memorising the data from the first detection means and also to the second and third detection means in order to control the locking of the automobile automatically in the case where the following conditions are detected successively:

opening of a door of the automobile, stopping of the engine and closing of all the doors of the automobile, absence of the identifier in the monitoring zone outside the automobile at a time (t), presence of the identifier in the monitoring zone at a time (t−1) preceding the time (t) at which the absence of the identifier was detected.

14. Locking device as claimed in claim 13, wherein it further comprises fourth means for verification of the presence or the absence of an occupant in the passenger cell of the automobile, these means being functionally connected to the unit for control of the locking of the automobile in such a way as to permit the actuation of the automatic locking of the automobile only in the case where the detection means have permitted verification that no occupant is situated in the interior of the passenger cell of the automobile.

15. Device as claimed in claim 13, wherein the first detection means are used in order to carry out the unlocking of the automobile in an automatic manner within the framework of a system of access and starting without manual intervention, that the second detection means constitute an element of a security device of the automobile and that the third detection means constitute a monitoring element of the automobile.

16. Automatic locking device as claimed in claim 15, wherein the means for verification of the non-presence of occupants in the passenger cell of the automobile constitute an element of a perimetric alarm of the automobile.

17. Locking device as claimed in claim 13, wherein the first means for detection of the presence or the absence of an identifier in at least one monitoring zone outside the vehicle include at least one transmitting and receiving antenna fixed on the automobile and controlled in such a way as to transmit a low-frequency wave into at least one coverage zone at the periphery of the automobile and to pick up a return wave originating from the identifier.

18. Locking device as claimed in claim 17, wherein the transmitting and receiving antenna is controlled in such a way as to transmit a low-frequency wave, the frequency of which is close to 125 kHz.

19. Locking device as claimed in claim 17, wherein the first detection means (1) include a plurality of transmitting/receiving antennas fixed on the automobile in such a way as to transmit waves particularly at low frequency into a plurality of respective coverage zones extending at the periphery of the automobile.

20. Locking device as claimed in claim 19, wherein some of the transmitting/receiving antennas fixed on the automobile and in particular fixed at the rear of the automobile have a transmission power which can be operated at a higher level than the rated transmission power level, into a plurality of respective coverage zones (18a, 18b, 18c, 18d, 18e, 18f) extending at the periphery of the automobile (16).

* * * * *

UNITED STATES PATENT AND TRADEMARK OFFICE
CERTIFICATE OF CORRECTION

PATENT NO.        : 6,853,296 B2
APPLICATION NO. : 10/363268
DATED             : February 8, 2005
INVENTOR(S)       : Michael Chandebois Page 1 of 1

It is certified that error appears in the above-identified patent and that said Letters Patent is hereby corrected as shown below:

<u>On the title page of the patent in item (30); Foreign Application Priority Data</u>
Please add two Foreign Application Priorities, which are;

--Nov. 8, 2000 (FR) ... 00 14344-- and
--Jul. 6, 2001 (FR) ... 01 09040--.

Signed and Sealed this

Twenty-eighth Day of August, 2007

JON W. DUDAS
*Director of the United States Patent and Trademark Office*